Dec. 29, 1942.    C. E. HOOD    2,306,441
SPLITTING MACHINE
Filed Sept. 17, 1941    4 Sheets-Sheet 2

Dec. 29, 1942.  C. E. HOOD  2,306,441
SPLITTING MACHINE
Filed Sept. 17, 1941  4 Sheets-Sheet 4

Patented Dec. 29, 1942

2,306,441

UNITED STATES PATENT OFFICE 2,306,441

SPLITTING MACHINE

Charles E. Hood, Lynn, Mass., assignor to United Shoe Machinery Corporation, Flemington, N. J., a corporation of New Jersey Application September 17, 1941, Serial No. 411,216

10 Claims. (Cl. 69—11)

This invention relates to splitting machines and is herein illustrated as embodied in a machine particularly adapted to the splitting of soles which are to be used in the manufacture of boots and shoes.

In the manufacture of boots and shoes it is usual to cut out soles from a hide by means of a die; and, inasmuch as the thickness of a hide varies in different portions, the individual soles cut therefrom are frequently not of the same thickness throughout their extent. It is customary to even the soles before incorporating them in shoes by removing a split from the flesh side of each. To this end the died out soles are sorted into groups the members of which have approximately the same thickness; and then the soles of each group are operated upon by a splitting machine which is adjusted in accordance with the desired thickness to which the members of each group are to be evened.

Commonly splitting or evening machines used for the above purpose comprise a stationary knife to which the soles are fed by two cylindrical rolls. In such machines the edge of the knife must be spaced somewhat from the bite of the rolls so that there is no support for the portion of the work from the bite of the rolls to the edge of the knife, with the result that the splitting cut, particularly during its first part, is liable to diverge from the desired parallel relation to the surface of the grain side of the work.

The present invention provides a machine which will rapidly and accurately split or even soles or similar pieces of work so as to produce a finished product which is of uniform thickness throughout.

To this end the machine comprises a knife, a turret upon which pieces of work may be placed, a conical roll which cooperates with the turret, and means for rotating the roll and turret in such manner that their surface speeds at the localities in which they cooperate are substantially the same; and preferably the roll is slotted, and through these slots the operative portions of presser fingers extend into close proximity to the knife. In the illustrated machine the turret is adjustable toward and from the knife to determine the thickness to which the work shall be split; and the roll is mounted for bodily movement toward and from the turret and for endwise tilting movement so as to provide for thicker and thinner pieces of work as well as for those which vary in thickness from one edge to the opposite edge.

These and other features of the invention including certain details of construction and combinations of parts will be described as embodied in an illustrated machine and pointed out in the appended claims.

Referring to the accompanying drawings.

Figure 4:
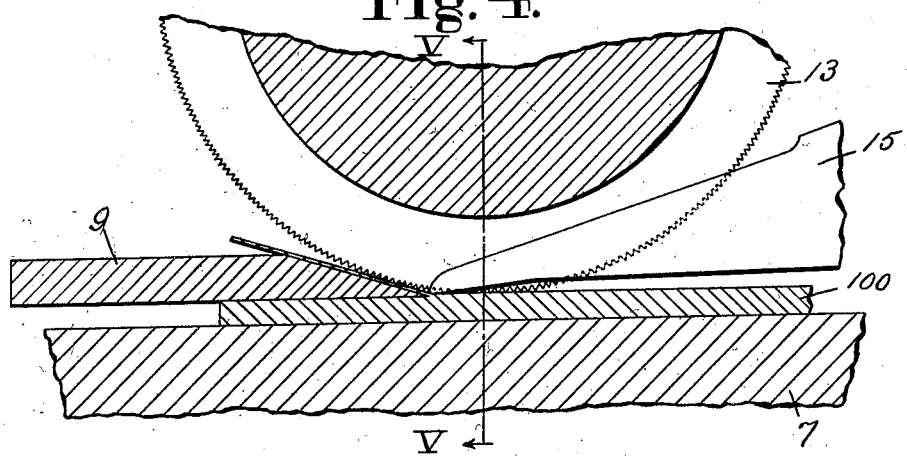
Fig. 4 is a detail principally in longitudinal section and on a greatly enlarged scale showing the manner in which the work is operated upon.

The machine comprises (Fig. 4) a rotary turret 7 upon which a piece of work such as a sole 100 is placed, a stationary knife 9, the under side of which is substantially parallel to the upper surface of the turret said under side being inclined at an angle of two or three degrees to the horizontal, a presser roll 13, and a series of presser fingers one of which is shown at 15. In the operation of the machine, the turret and the presser roll are rotated continuously; and the soles are placed one by one upon the turret and are split to an even thickness as indicated in the figure.

Figure 2:
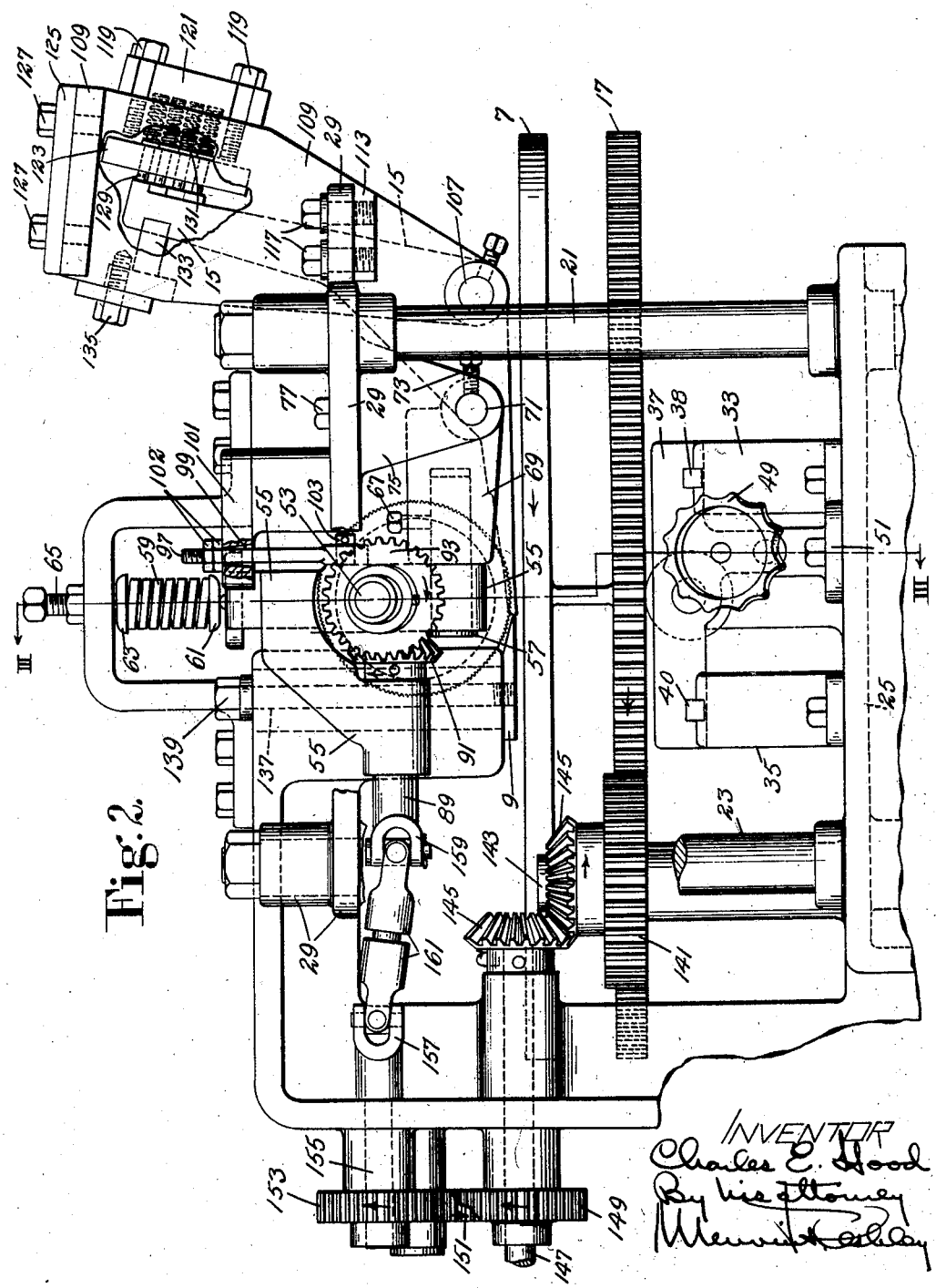
Fig. 2 is a side elevation of the machine.
Figure 3:
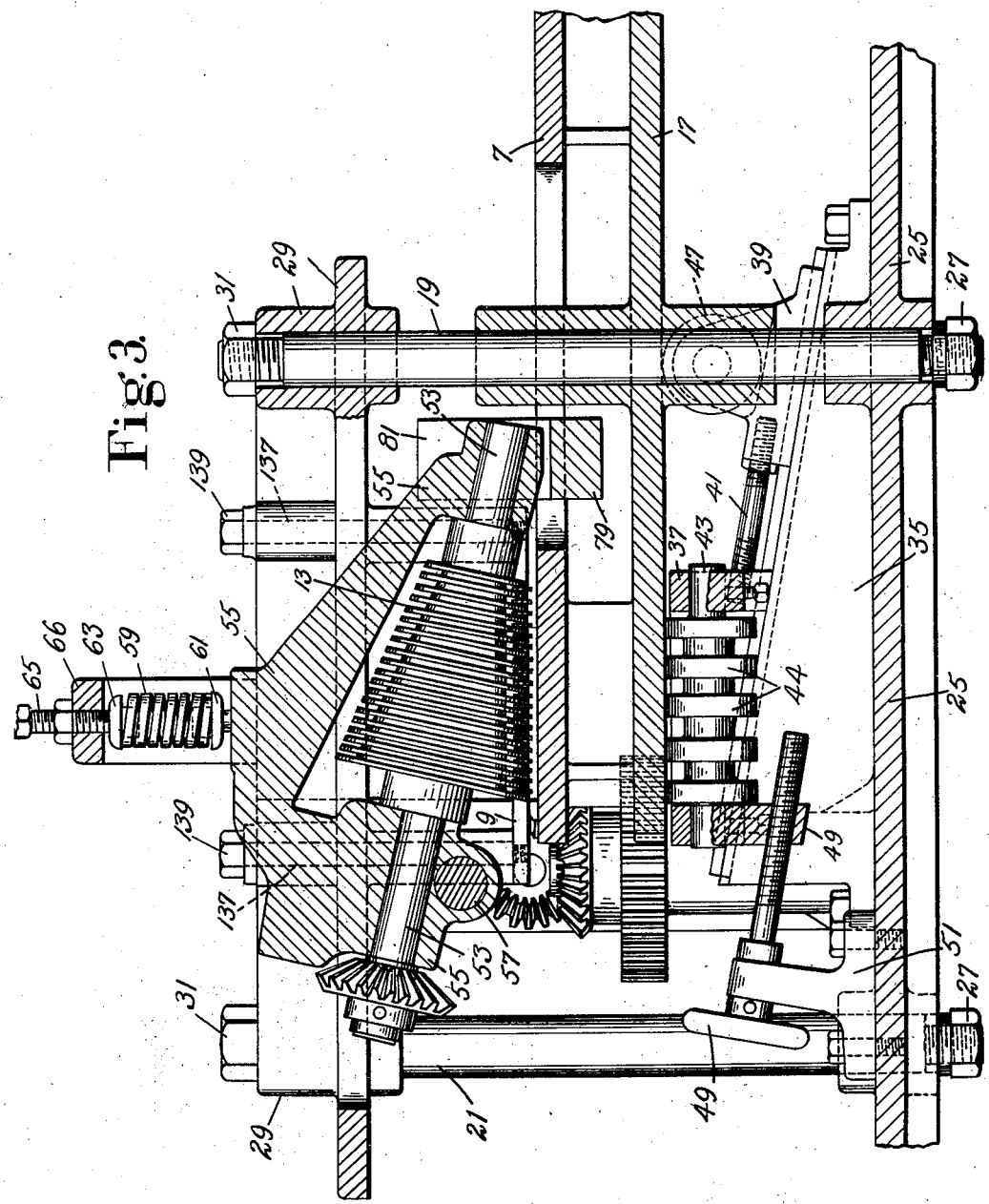
Fig. 3 is a cross-section on the line III, III of Fig. 2, certain parts including the roll and its shaft being shown in full lines.

The turret 7 (Fig. 3) has integral with it and located below it a large gear 17 the hub of which is rotatably mounted on an upright rod 19. This rod is one of three upright rods, the other two being indicated respectively at 21 and 23 (Fig. 2). The lower ends of these rods, which have threaded portions of reduced diameter, are fastened to a plate 25, which is part of the frame of the machine, by nuts 27 (Fig. 3) and is supported upon legs not shown. The upper ends of the three rods also have threaded portions of reduced diameter, and these portions extend up through bores in a heavy plate 29 and have nuts 31 threaded upon them. The rods thus support the heavy plate 29 spaced considerably above the turret 7. This plate 29, the function of which is to support the presser roll 9 and the presser fingers, is thus a part of the frame of the machine.

The large gear 17, which is rotatable on the upright rod 19, is also vertically adjustable upon said rod. In order to provide for adjustment of the gear and turret vertically on the rod, the gear is supported on two sets of rolls which may be raised and lowered. Fastened by screw bolts to the plate 25 are two wedge-shaped members, the forward one being shown at 33 (Fig. 1), the rear one at 35 (Fig. 3) and both being shown in Fig. 2. Slidably mounted on these wedge-shaped members are two roll supports 37, 39 adjustably connected by a small rod 41 having at its ends respectively right-hand and left-hand threaded portions which are threaded respectively into the two supports. The two slidable supports 37, 39 have grooves in their under faces to receive upper portions of two guide rods 38, 40 rectangular in cross-section which are carried by the wedge-shaped members. The support 37 carries a horizontal spindle 43 on which are rotatably mounted side by side a plurality of small rolls 44 which engage the gear along a locality substantially directly beneath the lowermost element of the presser roll so as to support the corresponding portion of the turret as soles are fed successively past the presser fingers to the knife. The other roll support 39 carries two rolls 45 (Fig. 1) and 47 (Fig. 3) one on each side of the upright rod 19. These supports 37 and 39 are adjusted simultaneously and held in adjusted position by turning a screw 49 which is threaded through a bore in a depending portion of the support 37 and has at one end a hand-hold, said screw being rotatable in but held from longitudinal movement with respect to a small bracket 51 which is fastened by screw bolts to the stationary plate 25.

The presser roll 13 (Figs. 3 and 5) is of frustoconical shape and consists of a hub having integral with it thin, spaced, toothed, disk-like work-engaging members of graduated diameter. This hub is fastened to an inclined shaft 53 which is rotatably mounted in a roll carrier 55, the construction being such that the lowermost elements of the disk-like work-engaging members lie in a plane parallel to the work-supporting face of the turret 7, and the axis of the roll shaft 53 intersects this plane at a point which lies in the axis of the rod 19 about which the turret rotates, said plane being substantially coextensive with the upper surface of the work as it is engaged by the roll and the turret. The roll carrier is capable of swinging about the axis of a stud 57 and is so mounted, as will presently be explained, that it may be adjusted bodily in a vertical path as well as angularly about the axis of the stud 57. A compression spring 59 exerts a continuous downward pressure upon the roll carrier. This spring extends between a cup-shaped washer 61, which has a depression on its under side and rests upon a small pin driven into the carrier, and a similar washer 63. A screw bolt 65, threaded through the upper horizontal portion of a bracket 66 of inverted U-shape, which is fastened to the heavy plate 29, backs up the washer 63 and provides means for varying the tension of the spring 59. The stud 57 (Fig. 2) is fastened by a screw bolt 67 in a socket in a heavy arm 69 which can swing up and down about the axis of a horizontal stud 71 fastened by a screw bolt 73 in a bore near one end of the arm, said stud 71 being rotatable in a bore in a bracket 75 which depends from near one end of the heavy plate 29 and is fastened to said plate by a screw bolt 77. Another arm 79 (Fig. 3) is similarly mounted for vertical swinging movement at the other end of the heavy plate 29 in position to engage the smaller right-hand end of the roll carrier 55 so as to guide the carrier vertically in its swinging movement about the axis of the stud 57. In order so to guide the carrier, the free end of the short heavy arm 79 has a vertical slot 81 in which the smaller end of the roll carrier 55 has a sliding fit. The two short heavy arms 69, 79 are both shown in Fig. 1, the arm 79 being angularly adjustable about the axis of a short stub 83 which is alined with the short stud 71 and is rotatable in a bracket 85 which corresponds to the bracket 75, the stud being fastened in the bore of the arm 79 by a screw bolt 87. The two arms 69, 79 are connected by a horizontal bar, not shown, which extends across the machine.

Referring now more particularly to Fig. 2, the roll carrier 55 adjacent to the higher end of the inclined roll-shaft 53 has depending from it an eye having a horizontal bore to receive the stud 57 and has extending from its left-hand side a projection formed with a horizontal bore in which is rotatably mounted a short horizontal shaft 89 carrying at its right-hand end a beveled gear 91 which meshes with a beveled gear 93 on the higher end of the inclined shaft 53 of the presser roll.

Figure 1:
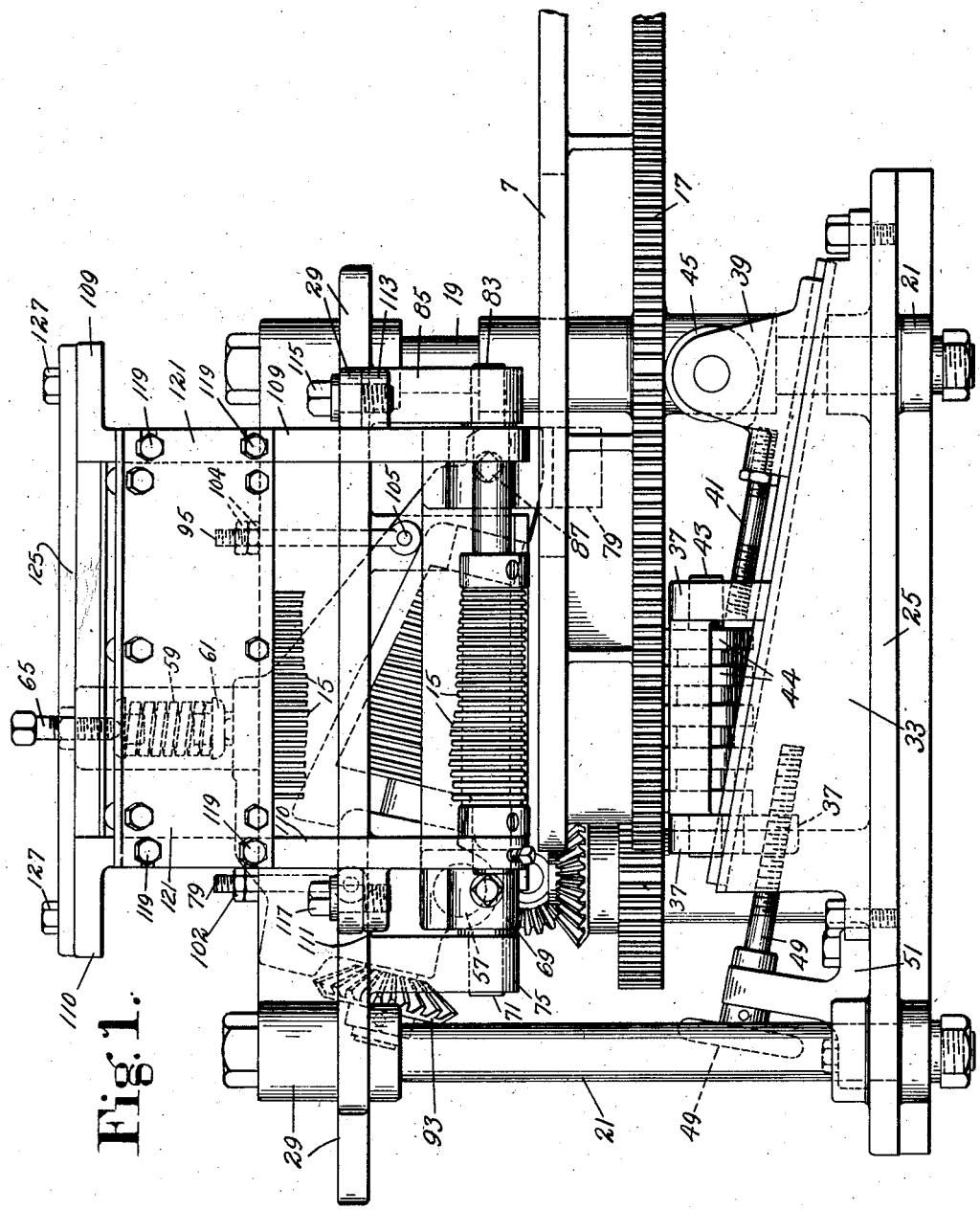
Fig. 1 is a front elevation of a machine in which the present invention is embodied, the upper portions of the presser fingers and their support having been omitted.

It is necessary to limit the downward movement of the presser roll so that the roll will never hit the knife, as well as to permit the roll to be adjusted angularly to line up its lower element parallel with the edge of the knife, and also to permit the roll to tilt lengthwise in response to soles of non-uniform thickness. To this end two small rods 95, 97 (Figs. 1 and 2) are provided, one near each end of the roll carrier 55. Since these rods and their mountings and connections are substantially the same, only one will be described in detail. The upper end of the rod 97 (Fig. 2) extends loosely through a conical hole 99 in the overhanging portion of a small bracket 101 which is fastened upon the heavy plate 29. The small rod may be adjusted vertically and held in adjusted position by manipulating nuts 102 threaded on its upper end. The lower end of the rod 97 has an eye to receive a pin 103 which is driven into the side of the roll carrier 55 near one end of said carrier. The other rod 95, near the other end of the carrier, is shown in Fig. 1, the pin 105 corresponding to the pin 103, and the nuts 104 corresponding to the nuts 102. With this construction the roll carrier may be adjusted vertically and angularly to cause the lower element of the conical presser roll to lie parallel to and spaced slightly from the knife. At the same time the roll may yield bodily upward and tilt about the axis of the stud 57.

The presser fingers 15 (Figs. 1 and 2) are mounted for angular movement about a horizontal rod 107 carried by a finger-support which is located above the turret 7. This support comprises two spaced, flat bars 109, 110 having respectively near their middle portions flat horizontal projections 111, 113 through which and through horizontal ears on the heavy plate 29 pass respectively screw bolts 115, 117. Fastened by four screw bolts 119 to the outside of the upper ends of the two spaced bars 109, 110 is a plate 121; and fixed in spaced parallel relation to this plate is a second plate 123. A long cap plate 125 is fastened across the top of the inclined bars 109, 110 by screw bolts 127. The inner face of the plate 121 is provided with a plurality of staggered sockets, one for each presser finger. The plate 123 is provided with a plurality of staggered holes each of which registers with a socket in the plate 121. Slidable through these holes are a plurality of pins 129 each having a collar near its outer end; and, between these collars and the bottoms of the sockets, are a plurality of small compression springs 131.

Each upwardly extending tail of a presser finger 15 has a projection which contacts with the inner end of one of the pins 129, and each upwardly extending tail near its upper end is received in a guide slot, not shown, in the approximately horizontal part of an angle iron 133, the approximately upright part of which is fastened to the bars 109, 110 by screw bolts one of which is shown at 135. The knife 9 (Figs. 2 and 3) is fastened at the bottom of downwardly extending hollow bosses on the heavy plate 29 by means of bolts 137 the lower reduced ends of which are threaded into the knife, and the upper ends of which carry nuts 139.

The large gear 17 (Fig. 2) meshes with a small gear 141 rotatable about an upright stud 143 and having rigid with it a bevel gear 145. This bevel gear meshes with a second bevel gear 145 at the right-hand end of a driving shaft 147 which may be rotated from any suitable source of power. Also fast to the shaft 147 is a gear 149 which meshes with an idle gear 151, said idle gear meshing in turn with a gear 153 on a shaft 155. The shaft 155 is connected with the shaft 89 by two universal joints 157, 159 and a two-part telescopic shaft 161. The gears are so proportioned and the shape of the presser roll is such that the surface speed of the turret at any given locality is the same as that of the conical feed roll at the corresponding locality.

Figure 5:
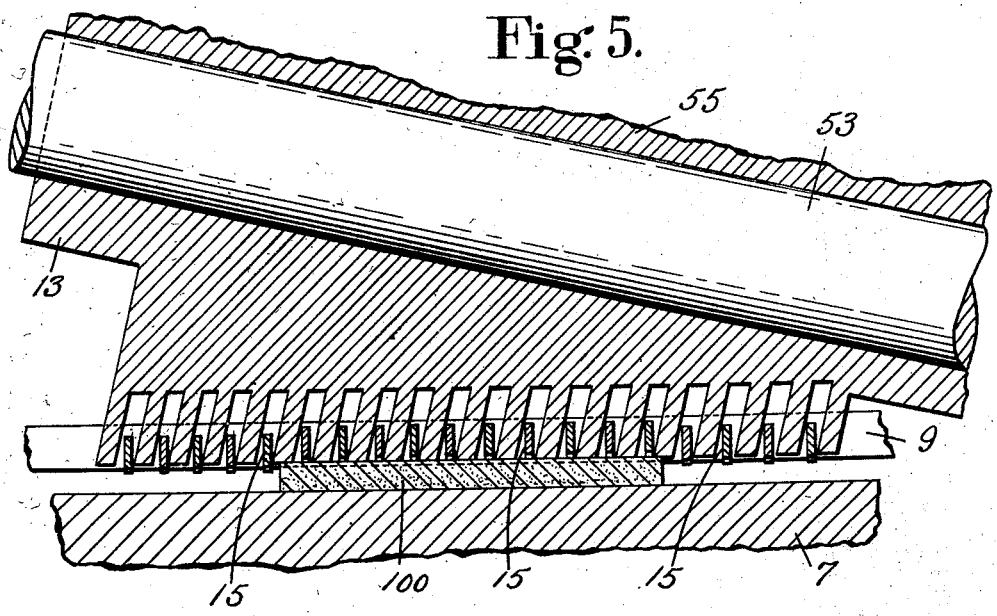
Fig. 5 is a cross-section on the line V, V of Fig. 4.

In the use of the machine, the turret is adjusted, by turning the hand wheel 49, into the desired position with respect to the knife; and the roll is adjusted bodily and angularly by turning the nuts 102, 104 until its lower work-engaging portion is parallel to the edge of the knife 9 as shown in Fig. 5. Thereafter, power having been applied to the driving shaft 147 to rotate the turret and the roll, the soles are placed upon the rotating turret and split to a predetermined uniform thickness.

Having thus described the invention, what I claim as new and desire to secure by Letters Patent of the United States is:

1. A splitting machine having in combination, a knife, a work support in the form of a turret, a cooperating conical roll, and means for rotating the roll and turret in such manner that the surface speeds of said members in the localities in which they cooperate are substantially the same.

2. A splitting machine having in combination, a knife, a work support in the form of a turret, a cooperating conical roll the axis of rotation of which intersects the axis of rotation of the turret at a point located in a plane which is substantially coextensive with the upper surface of the work as it is engaged by the roll and turret, and means for rotating the roll and turret in such manner that the surface speeds of said members in the localities in which they cooperate are substantially the same.

3. A splitting machine having in combination, a work support in the form of a turret, a cooperating conical roll the axis of which is located in a plane perpendicular to the work-supporting face of the turret, means for rotating the roll and turret in such manner that their surface speeds in the localities in which they cooperate are substantially the same, a stationary knife the edge of which is located back of said perpendicular plane considered in the direction of feed movement, said roll having spaced annular channels in its periphery, and a plurality of yielding presser fingers having operative ends extending through said channels and into close proximity to the edge of the knife.

4. A splitting machine having in combination, a knife, a work support in the form of a turret, a cooperating conical roll, and means for rotating the roll and turret, said turret being adjustable toward and from the plane of the knife.

5. A splitting machine having in combination, a knife, a work support in the form of a turret, a cooperating conical roll, means for rotating the roll and turret, a support for the turret including a member engaging the under side of the turret in position to support it against the thrust of the roll as it presses upon a piece of work, and means whereby the support may be adjusted to adjust the turret toward and from the plane of the knife.

6. A splitting machine having in combination, a knife, a work support in the form of a turret, a cooperating conical roll, means for rotating the roll and turret, a support for the turret including alined supporting rolls engaging the under side of the turret in position to support it against the thrust of the roll as it presses upon a piece of work, and means whereby the support may be adjusted to adjust the turret toward and from the plane of the knife.

7. A splitting machine having in combination a knife, a work support in the form of a turret, a cooperating conical roll, means for rotating the roll and turret in such manner that the surface speeds of said members in the localities in which they cooperate are substantially the same, and means for adjusting the turret toward and from the plane of the knife, said means including a support for the turret and an inclined guide upon which the support is slidably mounted.

8. A splitting machine having in combination a knife, a work support in the form of a turret, a cooperating conical roll, and means for rotating said turret and roll, said roll being yieldingly mounted for bodily movement toward and from the turret and for angular movement about an axis which is substantially parallel to the surface of the turret.

9. A splitting machine having in combination a knife, a work support in the form of a turret, a cooperating conical roll, means for rotating said turret and roll, a carrier for the roll, a pivot about which the carrier may swing to permit endwise tilting of the roll, said carrier and pivot being movable in unison toward and from the turret, and yielding means against the force of which the roll may thus tilt endwise or move bodily.

10. A splitting machine having in combination, a knife, a work support in the form of a turret, a cooperating conical roll, means for rotating said turret and roll, a carrier for the roll, a pivot about which the carrier may swing to permit endwise tilting of the roll, said pivot extending crosswise of the roll, an arm by which the pivot is carried, said arm being substantially at right angles to the pivot so that the pivot may move bodily toward and from the turret, yielding means tending at all times both to move the roll carrier bodily toward the turret and to swing said carrier about said pivot, and means for limiting the extent of the bodily and swinging movements.

CHARLES E. HOOD.